(12) United States Patent
Smith

(10) Patent No.: US 7,162,234 B1
(45) Date of Patent: Jan. 9, 2007

(54) WIRELESS COMMUNICATION DEVICE

(75) Inventor: Mark Jeffrey Smith, San Antonio, TX (US)

(73) Assignee: Mark J. Smith, San Antonio, TX (US)

( * ) Notice: Subject to any disclaimer, the term of this patent is extended or adjusted under 35 U.S.C. 154(b) by 115 days.

(21) Appl. No.: 10/760,616

(22) Filed: Jan. 20, 2004

Related U.S. Application Data

(60) Provisional application No. 60/484,493, filed on Jul. 3, 2003, provisional application No. 60/471,978, filed on May 20, 2003.

(51) Int. Cl.
*H04M 7/20* (2006.01)
*H04M 1/80* (2006.01)

(52) U.S. Cl. .............................. 455/426.2; 455/426.1; 455/3.01

(58) Field of Classification Search ............. 455/426.1, 455/426.2, 3.01
See application file for complete search history.

(56) References Cited

U.S. PATENT DOCUMENTS

| | | | |
|---|---|---|---|
| 6,377,782 B1* | 4/2002 | Bishop et al. | 455/3.01 |
| 2003/0185169 A1* | 10/2003 | Higgins | 370/329 |
| 2003/0193307 A1* | 10/2003 | Burstein | 318/473 |
| 2004/0151282 A1* | 8/2004 | Jones et al. | 379/37 |

* cited by examiner

*Primary Examiner*—Barry Taylor
(74) *Attorney, Agent, or Firm*—Buskop Law Group PC; Wendy K. Buskop

(57) ABSTRACT

A wireless communication device for communicating information from a bidirectional high speed data cable modem via an Ethernet connection using a first radio transceiver at a first location and communicating with a second radio transceiver at a customer's premises, wherein the housing connects to a supporting strand which supports a coaxial cable carrying a RF spectrum signal and AC power as described herein.

9 Claims, 4 Drawing Sheets

WIRELESS COMMUNICATION DEVICE

The current application claims priority to co-pending U.S. patent application Ser. No. 60/471,978 filed May 20, 2003 and co-pending U.S. patent application Ser. No. 60/484,493 filed Jul. 3, 2003, which are incorporated herein by reference.

FIELD

Embodiments of the invention relate to a wireless communication device to transmit information from a bi-directional high speed data cable modem/router via an Ethernet connection. The device generally uses two radio transceivers for an inexpensive data and communication device usable without the need for construction or hardwiring.

BACKGROUND

Hybrid fiber coaxial networks (HFC networks) are typically used for delivery of television signals to subscribers. Each subscriber represents either an individual or a business and is connected to the cable TV HFC network through a trunk and branch configuration to individual subscribers.

The HFC network can also carry a connection to the Internet, voice, fax and data. To date, customers in business have had great challenges in connecting to the HFC network. The present invention was designed to meet that need.

A need has long existed to expand the serviceable market to provide Internet, voice, fax and data connectivity. The present invention addresses the need to a less expensive and faster technique to permit customers to access these services over cable in commercial facilities.

Another need in the business was to have a system that can be used through a window so that no roof rights are required by a client for connecting to the HFC network.

SUMMARY

The device is a housing with a bidirectional high speed data modem/router operably connected to a first radio transceiver, a first radio processor card, and a switching power supply. The included splitter is adapted to engage the coaxial cable and split the RF spectrum signal from the AC power. The device includes at least one heating and cooling device adapted to heat and cool contents of the housing.

BRIEF DESCRIPTION OF THE DRAWINGS

Aspects of the present system will be described in greater detail with reference to the appended figures.

The present embodiments are detailed below with reference to the listed Figures.

DETAILED DESCRIPTION OF THE PREFERRED EMBODIMENTS

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the pertinent art to make and use the inventions, when the information in this patent is combined with available information and technology. Various terms as used herein are defined below. To the extent a term used in a claim is not defined below, it should be given the broadest definition persons in the pertinent art have given that term as reflected in printed publications and issued patents.

With reference to the figures, an embodiment is wireless communication device for communicating information from a bidirectional high speed data cable modem/router via an Ethernet connection. The device uses a first radio transceiver at a first location and a second radio transceiver at a customer's premises.

The device includes a housing with a bidirectional high speed data modem/router operably connected to a first radio transceiver, a first radio processor card, and a switching power supply. The included splitter is adapted to engage the coaxial cable and split the RF spectrum signal from the AC power. The device includes at least one heating and cooling device adapted to heat and cool contents of the housing.

Figure 1:
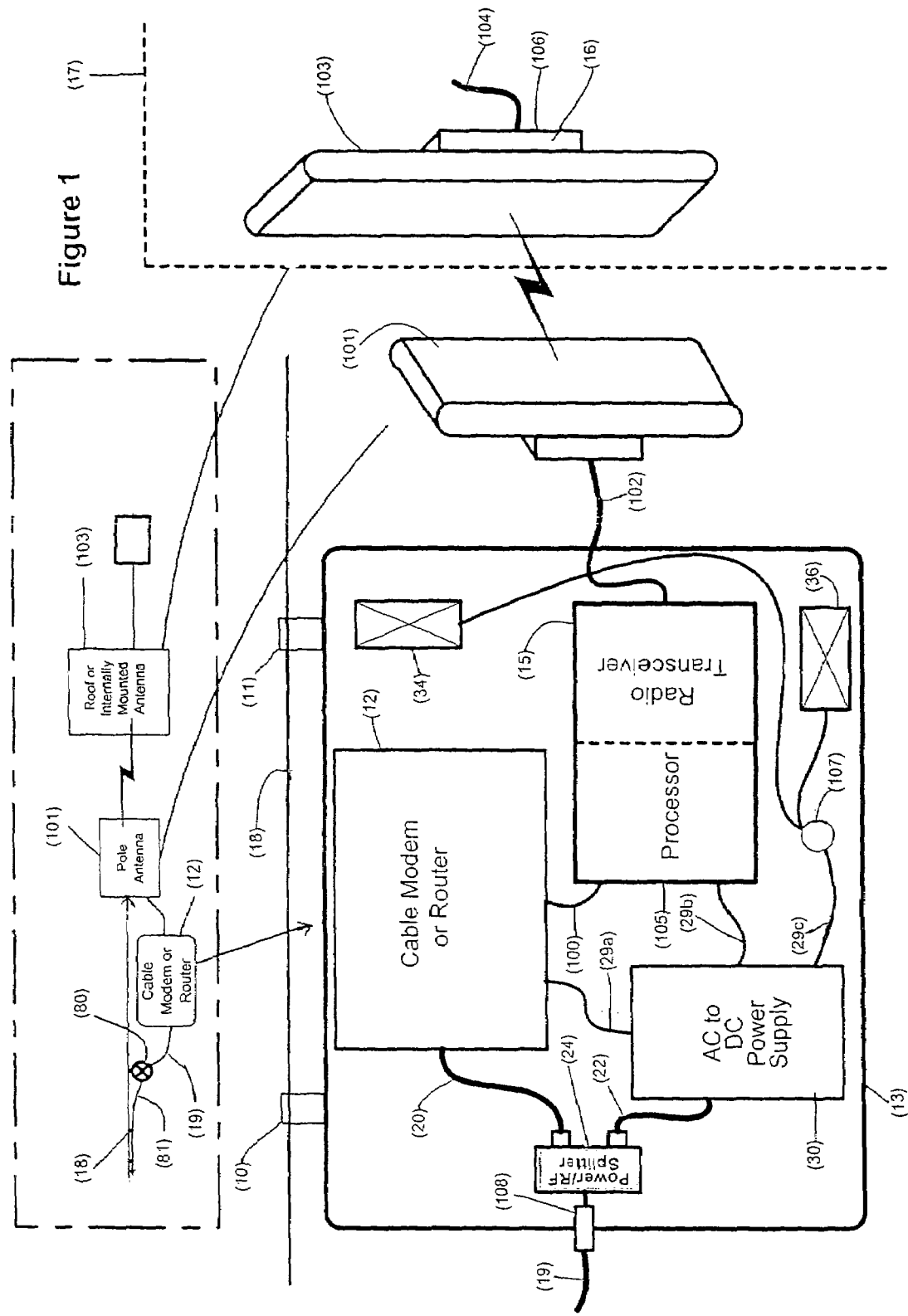
FIG. 1 is a diagram of the system.

FIG. 1 relates to the system used to communicate information from a bidirectional high speed data cable modem/router via a wireless Ethernet connection, which can be a radio transceiver and cable combination to a customer's location.

Wirelessly communicating is preferably radio based communication, but can include infrared, laser based or light based communication. In addition, other electromagnetic frequency communication (microwave) frequency can be used within the scope of this invention.

Although the system is illustrated as a single particular communications channel in FIG. 1, multiple links and channels of those links, such as communications links of wired and wireless channels, can be used in embodiments of the invention described herein.

Returning to FIG. 1, a cable modem/router (12), such as a DOCSIS cable modem/router, is disposed in a housing (13). The cable modem/router and housing are connected to a supporting strand (18), such as with a first mounting bracket (10) and a second mounting bracket (11). The supporting strand supports a fiber/coaxial cable (19). The housing is preferably water or weather resistant housing, such as one made from molded plastic, metal, a composite, a weatherproof water tight coated laminate or combinations thereof. The housing is large enough to hold the cable modem/router, at least one heating and/or cooling device, one or more radio transceivers, a power supply converter, thermostat (107), and associated cables. The housing can also include a lightning protector.

Figure 2:
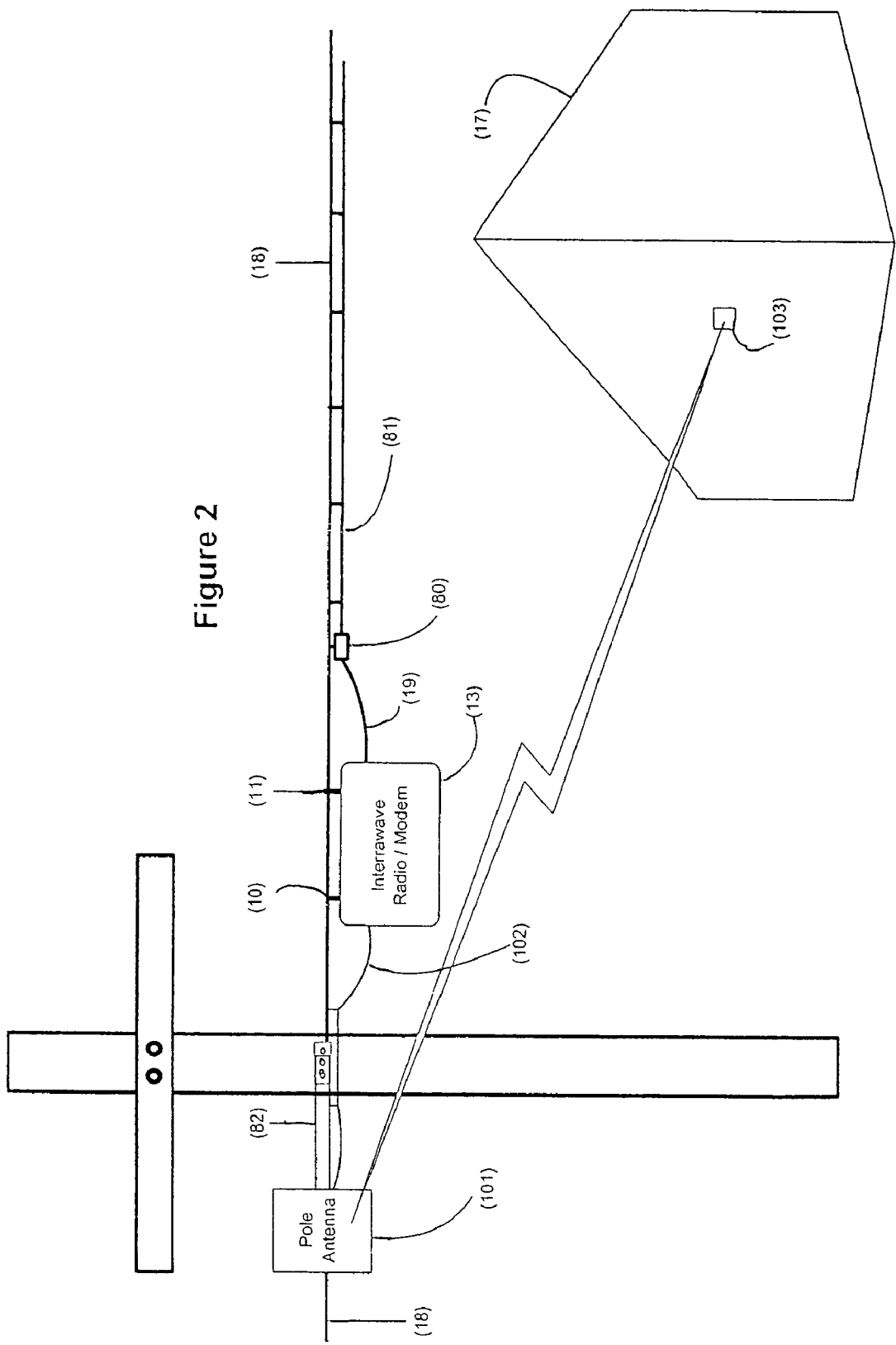
FIG. 2 depicts a detailed view of the strand with accompanying coaxial cable used in the method of FIG. 1.

The supporting strand (18) described in the invention is shown in detail in FIG. 2, wherein the strand supports the fiber/coaxial cable (19) which contains an RF spectrum signal (20), which is preferably a CATV signal, but can also be other types of signals. The RF spectrum signal can have digital content, such as digital music, and also return information, such as compressed video libraries. The coaxial cable (19) also provides a source of AC power (22) which is typically between approximately 50 volts up to and slightly exceeding 100 volts. In one embodiment, the supporting strand (18) and the fiber/coaxial cable (19) are sealed inside a material, such as rubber.

Returning to FIG. 1, a splitter (24) receives the input from the fiber/coaxial cable (19) and splits the input into an RF spectrum signal (20) and the AC power (22). Preferably the splitters accept a combined AC/RF signal fed into a single input, such as an F connector, and separates the combined AC/RF into two separate outputs, one being RF and the other being the AC power, each with their own connectors.

The RF spectrum signal is communicated to a bidirectional high speed data cable modem/router (12) which is preferably a DOCSIS cable modem/router, such as a model PCX 100 manufactured by Toshiba of Tokyo Japan, or a similar data over cable system interface specification (DOCSIS) modem/router, such as those available from Cisco of Sunnyvale Calif. or Motorola of Arizona.

The cable modem/router (12) communicates with a first processor PCB (105) which can accommodate either one or two radio transceivers (15) over a cable (100) in the preferred embodiment. The radio transceiver is typically any wireless device or 802.11X wireless device, such as an Orinoco Wireless networks radio transceiver or a Dell model 1150 True Mobile 11 Mbps Wireless LAN adapter or another compatible 802.11X receiver as known to one skilled in the art.

The first processor PCB (105), power supply (30), radio transceiver (15) and the cable modem/router (12) are temperature regulated using first heating and/or cooling device (34) and optionally a second heating and/or cooling device (36). The first radio transceiver, cable modem/router, and heating and cooling devices in the housing (13) are all powered from an AC to DC power supply (30) that provides a plurality of DC power supplies (29a, 29b, 29c, 29d, and 29e) to each of these units.

The power results from the AC power being split from the coaxial cable then transmitted to a switching power supply such as a switching power supply from Integrated Power Design, which converts and regulates the AC to DC power. The outputs are between 0.1 and 48 volts DC current. One or more outputs of the switching power supply can have this voltage. In the embodiments, the outputs are preferably either 12 volts or 9 volts each. The first processor card (105) communicates with a radio transceiver (15). The first radio transceiver (15) preferably communicates with a first antenna (101) via an RF cable (102). Antennas manufactured by Arc Wireless of Denver, Colo. are particularly usable in the invention.

The first radio transceiver (15) preferably communicates with a first antenna (101) via an RF cable (102). Antennas manufactured by Arc Wireless of Denver, Colo. are particularly usable in the invention.

The first antenna (101) wirelessly communicates with a second antenna (103) at a client's premise (17). The second antenna communicates with a second radio transceiver (16) that communicates to a second processor card (106) that communicates to a client device (305) via an Ethernet cable (104).

In a preferred embodiment, the first antenna is fastened to a pole mounting bracket (82) that in turn is typically fastened to a utility pole for stability. The second antenna either can be roof mounted or mounted behind a non-metallic wall or window for communicating with the first antenna.

An example of a method using the system generally includes splitting the signal with an RF/power splitter from the coaxial cable into the RF spectrum signal and the AC power.

The method further includes transmitting the RF spectrum signal from the splitter into the bidirectional high speed data cable modem/router and generating a digital Ethernet signal from the modem/router to the first processor card and the first radio transceiver.

The method can include converting the AC power to DC power using a converter and stepping down the voltage with a switching power supply.

Further, the method includes converting the AC power to DC power using a converter and stepping down the voltage with a switching power supply. The switching power is then used to supply power to the modem/router, processor and the radio transceiver, as well as a plurality of heating and cooling devices. The heating and cooling devices are adapted to heat or cool the contents of the housing.

The processor signals are communicated from the processor PCB to the first radio transceiver. The method continues by communicating the signal from the first radio transceiver to a first antenna, transmitting the signal from the first antenna to a second antenna and communicating the signal from the second antenna to a second radio transceiver then to a client device.

In a preferred embodiment, the cable modem/router can perform half duplex communications. However, full duplex communications are also appropriate depending upon a specific application.

Figure 3:
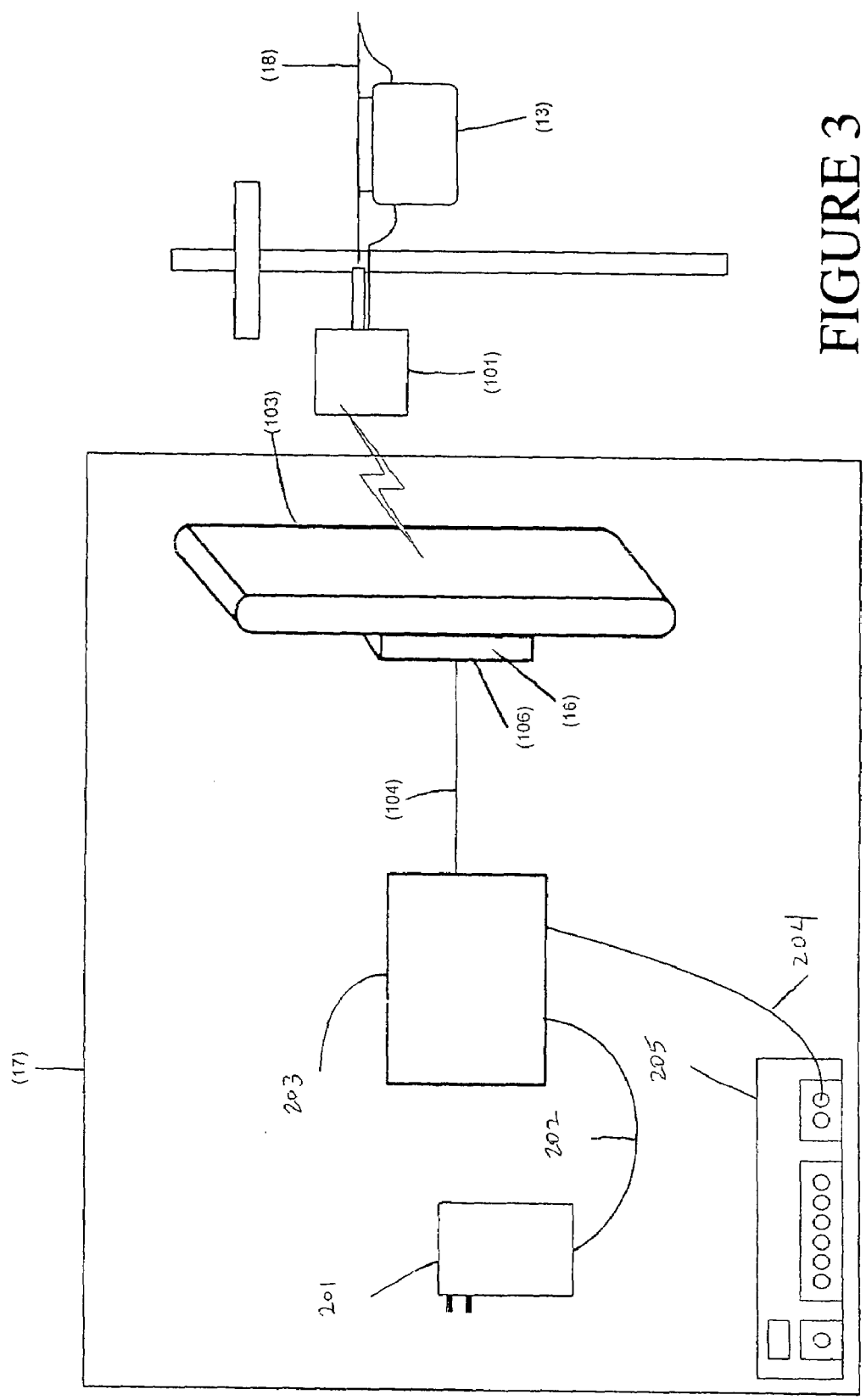
FIG. 3 depicts a view of the customer's site connected to the system.

FIG. 3 depicts the customer's premises using the device. A signal from the first antenna (101) is transmitted into a customer's premises (17). The signal is received by the second antenna (103), which connects to the second radio transceiver (16). The second transceiver (16) connects to a second radio processor card (106). The card (106) then transmits an Ethernet signal carried by a cable (104), which is preferably a Ethernet cable that communicates via a cable (204), to the customer's LAN or computer or other Ethernet device.

Power to operate the radio processor card (106) and the antenna (103) is provided by a power over Ethernet system that includes an AC switching power supply (201) connected to a power cord (202), which is connected to an Ethernet power inserter (203), which delivers power across the Ethernet cable (104) to the processor card affiliated with the antenna (103). An antenna communicates with the second processor card and carries the bidirectional signal to the client's device (205) that can attach to a hub, switch, router or other Ethernet connection.

In one embodiment, the cable modem/router (12) communicates with a Wide Area network ("WAN") connection (20). In another embodiment, the processor card (16) communicates with a client device (205) such as a PC or Local Area network ("LAN") connection.

In one embodiment, the bidirectional high speed data modem/router is a data over cable system interface specification (DOCSIS) modem/router. The DOCSIS modem/router can have a functionality consisting of automatic registration, encryption, and automatic assignment of IP addresses.

In one embodiment, the client device includes a computer, a local area network (LAN), a network hub, a remote terminal unit for monitoring remote equipment, a camera, fax, phone, or combinations thereof.

The computer can be any micro processing device that includes processing and memory functions, such as a personal digital assistant, a notebook computer, a processor-equipped cellular phone or any other similar device.

The computer can further include a co-processor module, which includes a digital signal processor (DSP) to enhance processing capabilities and capacity of the computer. The DSP of the co-processor module can serve a variety of functions and operations, such as, supplying added encryption/decryption, communications, protocol handling and location capabilities, e.g., global positioning system calculations, for example. The co-processor module is particularly suited for enabling and enhancing operations of the computer according to the protocols and ASP services systems and methods described herein.

In one embodiment, the system further includes a housing to encase the splitter, first radio transceiver, converter, switching power supply and communication links. The housing can be formed of a material such as molded plastic, a metal, a composite material, weatherproof sealed coated laminate or combinations thereof.

In another embodiment, the system further includes a second transceiver disposed in the housing in parallel communication with the bidirectional high speed data modem/router. For example, the modem/router can be connected to the strand independent of connection to a utility pole.

In one embodiment, the housing further includes a detector for detecting a first location of the client device. For example, the detector is a computer. The invention is capable of the bi-directional transmission of such information that may be one or more signals such as data, phone, fax, video, audio, USB, Internet, multimedia or any combination thereof.

Figure 4:
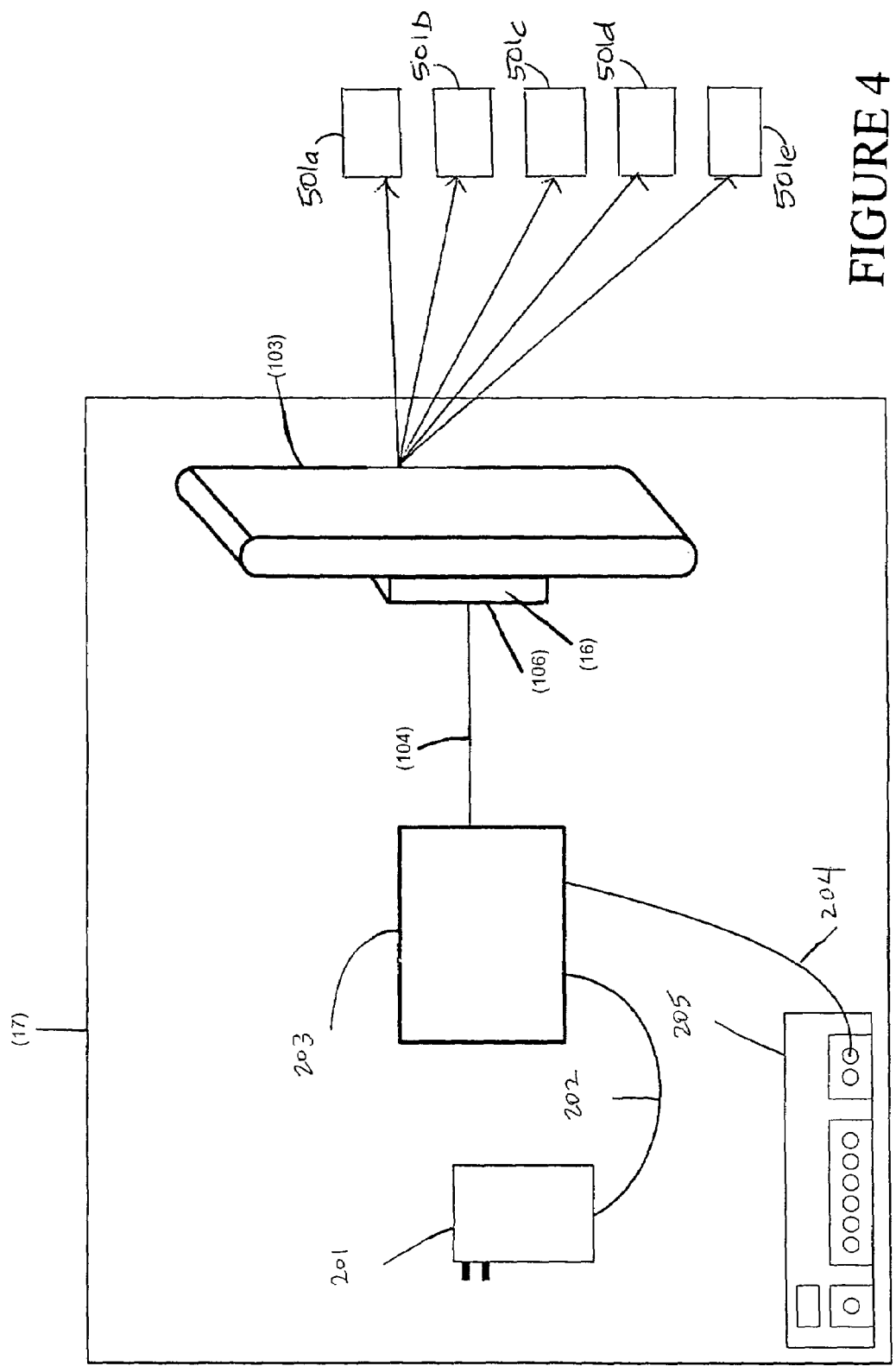
FIG. 4 depicts a view of electronic devices connected to the system.

FIG. 4 depicts the embodiment of the system of wirelessly communicating information from a bidirectional high speed data cable modem via an Ethernet connection that uses a first radio transceiver at a first location and communicates to a plurality of electronic devices. Each electronic device includes radio transceivers. The method entails beaming the signal from the first antenna to at least one of a plurality of electronic devices (501a, 501b, 501c, 501d, and 501e).

Examples of electronic devices (501a, 501b, 501c, 501d, and 501e) are laptops, PCs computers, personal digital assistants (PDA), personal electronic devices communicating with satellites, cell phones, GPS location devices, or other mobile electronic devices that can interface to networks. The radio transceiver card installed in the electronic devices can be card rated IEEE 802.11b or 802.11 g card or a similar type card.

The method creates a public access area known as a "hot spot" from the housing. The housing contains modems and other equipment to connect to the electronic devices for public high speed internet access. The method additionally includes authentication techniques to enable access by a user using a defined protocol, such as a set of e-mail addresses.

The method can also be adapted to comprise further a technique, such as management techniques, billing techniques, accounting techniques, reporting techniques, and combinations thereof. These techniques enable additional reports on at least one of the electronic devices.

The method also include the unique features including
  a. capable of incorporating any cable modem/router into the device that meets the enclosures size and power requirements;
  b. capable of providing point-to-point and or point-to-multipoint transmission of secure non 802.X signal using inexpensive 802.X hardware;
  c. usable as a standard 802.11X access point allowing users to access high speed internet and/or local area networks wirelessly;
  d. usable as a 802.11X "Hot Spot" device with the ability to communicate with a AAA appliances or any other 802.11X wireless device and allow clients high speed internet access through various means of authentication such as, but not limited to a user's email address or credit card information;
  e. ability to change operation of the device to any of the above claims 2, 3, or 4 through changes in software switches; and
  f. usable as a unique pole mounting bracket that allows for a stable mounting of the antenna that in most cities does not require a permit because no contact with the utility pole itself is made.

The device can be used as part of a wireless communication system adapted for communicating information from a bidirectional high speed data cable modem/router via an Ethernet connection. The system communicates the information using a first radio transceiver at a first location and sends the information to a second radio transceiver at a customer's premises.

The system includes a housing containing a bidirectional high speed data modem/router operably connected to a first radio transceiver, a first radio processor card, and a switching power supply. The housing is operably connected to a supporting cable strand. The supporting cable strand simultaneously supports a coaxial cable carrying an RF spectrum signal and an AC power signal. The system has at least one heating and cooling device to heat and cool contents of the housing.

The system also includes a splitter adapted to engage the coaxial cable and split the RF spectrum signal from the AC power.

The first radio processor card is adapted to send a signal from the first radio transceiver, send the same signal to the first antenna, and then beam the signal from the first antenna to a second antenna.

The system is also adapted to communicate the signal from the second antenna to a second radio transceiver and then to a second radio processor card and then to a client device.

While these embodiments have been described with emphasis on the preferred embodiments, it should be understood that within the scope of the appended claims, these embodiments might be practiced other than as specifically described herein.

What is claimed is:

1. A wireless communication device for communicating information from a bidirectional high speed data cable modem via an Ethernet connection using a first radio transceiver at a first location and communicating with a second radio transceiver at a customer's premises comprising:
  a. a housing containing a interchangeable bidirectional high speed data modem operably connected to a first radio transceiver, a first radio processor card, and a switching power supply, wherein the housing further comprises a mounting bracket to connect the housing to a strand comprising a coaxial cable;
  b. a splitter adapted to engage the coaxial cable and split the RF spectrum signal from AC power, wherein the switching power supply converts the AC power to DC power; and
  c. at least one heating and cooling device adapted to heat and cool contents of the housing.

2. The device of claim 1, wherein the interchangeable bidirectional high speed data modem communicates with a Wide Area network ("WAN") connection.

3. The device of claim 1, wherein the interchangeable bidirectional high speed data modem communicates with a wireless Local Area network ("LAN") connection.

4. The device of claim 1, wherein the Interchangeable bidirectional high speed data modem/router is a data over cable system interface specification (DOCSIS) modem/router.

5. The device of claim 4, wherein the DOCSIS modem/router has a functionality consisting of automatic registration, encryption, and automatic assignment of IP addresses.

6. The device of claim 1, wherein the housing is formed of a material comprising molded plastic, a metal, a composite material, weatherproof sealed coated laminate or combinations thereof.

7. The device of claim 6, wherein the housing further comprises a second interchangeable bidirectional high speed data modem disposed in parallel communication with the interchangeable bidirectional high speed data modem.

8. The device of claim 1, wherein housing further comprises a detector for detecting a first location of the client device.

9. The system of claim 1, wherein the interchangeable modem is a router.

* * * * *

UNITED STATES PATENT AND TRADEMARK OFFICE
CERTIFICATE OF CORRECTION

PATENT NO.       : 7,162,234 B1
APPLICATION NO.  : 10/760616
DATED            : January 9, 2007
INVENTOR(S)      : Smith Page 1 of 1

It is certified that error appears in the above-identified patent and that said Letters Patent is hereby corrected as shown below:

In the Claims

In Column 7, Line 8, in Claim 4, delete "Interchangeable" and insert -- interchangeable --, therefor.

In Column 8, Line 12, in Claim 9, delete "system" and insert -- device --, therefor.

Signed and Sealed this
Twenty-fourth Day of December, 2013

Margaret A. Focarino
*Commissioner for Patents of the United States Patent and Trademark Office*